United States Patent
Goesmann et al.

(10) Patent No.: US 9,620,750 B2
(45) Date of Patent: Apr. 11, 2017

(54) HIGH-VOLTAGE STORAGE DEVICE

(71) Applicants: BAYERISCHE MOTOREN WERKE AKTIENGESELLSCHAFT, Munich (DE); DIEHL METAL APPLICATIONS GMBH, Berlin (DE)

(72) Inventors: Hubertus Goesmann, Auernheim (DE); Christoph Born, Munich (DE); Harald Heck, Nuremberg (DE); Frank Warmuth, Borkheide (DE)

(73) Assignee: Bayerishe Motoren Werke Aktiengesellschaft, Munich (DE)

( * ) Notice: Subject to any disclaimer, the term of this patent is extended or adjusted under 35 U.S.C. 154(b) by 21 days.

(21) Appl. No.: 14/357,517

(22) PCT Filed: Nov. 23, 2012

(86) PCT No.: PCT/EP2012/004858
§ 371 (c)(1),
(2) Date: May 9, 2014

(87) PCT Pub. No.: WO2013/075840
PCT Pub. Date: May 30, 2013

(65) Prior Publication Data
US 2014/0322589 A1    Oct. 30, 2014

(30) Foreign Application Priority Data
Nov. 24, 2011   (DE) .................. 10 2011 087 032

(51) Int. Cl.
*H01M 2/10*   (2006.01)
*H01M 2/20*   (2006.01)
(Continued)

(52) U.S. Cl.
CPC ....... *H01M 2/1077* (2013.01); *B60L 11/1864* (2013.01); *B60L 11/1879* (2013.01);
(Continued)

(58) Field of Classification Search
None
See application file for complete search history.

(56) References Cited

U.S. PATENT DOCUMENTS

| 5,415,956 | A | 5/1995 | Ching |
| 5,639,571 | A | 6/1997 | Waters et al. |

(Continued)

FOREIGN PATENT DOCUMENTS

| DE | 8329237 | 1/1984 |
| DE | 29515860 | 1/1996 |

(Continued)

*Primary Examiner* — Miriam Stagg
*Assistant Examiner* — Carmen Lyles-Irving
(74) *Attorney, Agent, or Firm* — Sheridan Ross P.C.

(57) ABSTRACT

The present invention refers to a high-voltage battery for power supply, particularly of an automotive vehicle, comprising: an energy storage module with a plurality of electrochemical storage cells and a wall accommodating the plurality of storage cells, each storage cell comprising at least two electric connection terminals, and an upper part for contacting and covering the connection terminals, said upper part overlapping the wall in a contactless manner, so that a gap remains relative to the storage cells.

9 Claims, 3 Drawing Sheets

(51) Int. Cl.
*H01M 2/34* (2006.01)
*B60L 11/18* (2006.01)

(52) U.S. Cl.
CPC ......... *H01M 2/1072* (2013.01); *H01M 2/206* (2013.01); *H01M 2/34* (2013.01); *Y02T 10/7005* (2013.01); *Y02T 10/7061* (2013.01)

(56) References Cited

U.S. PATENT DOCUMENTS

| | | | |
|---|---|---|---|
| 2010/0073005 A1 | 3/2010 | Yano et al. | |
| 2012/0052333 A1* | 3/2012 | Baek | H01M 2/0404 429/7 |

FOREIGN PATENT DOCUMENTS

| | | |
|---|---|---|
| DE | 60121114 | 2/2007 |
| DE | 102008034854 | 1/2010 |
| DE | 102008034871 | 1/2010 |
| DE | 102008034876 | 1/2010 |
| DE | 102009041738 | 2/2011 |
| DE | 102010064315 | 7/2011 |
| DE | 102010020065 | 11/2011 |
| DE | 102010039417 | 2/2012 |
| EP | 1775784 | 4/2007 |
| EP | 1629550 | 9/2008 |
| EP | 2339672 | 6/2011 |
| EP | 2445032 | 4/2012 |
| GB | 2330251 | 4/1999 |
| WO | WO 2011/038908 | 4/2011 |

* cited by examiner

HIGH-VOLTAGE STORAGE DEVICE

CROSS REFERENCE TO RELATED APPLICATIONS

This application is a national stage application under 35 U.S.C. 371 and claims the benefit of PCT Application No. PCT/EP2012/004858 having an international filing date of Nov. 23, 2012, which designated the United States, which claims the benefit of German Patent Application No. 102011087032.6 filed Nov. 24, 2011, the entire disclosure of both the above-identified applications are incorporated by reference herein.

The present invention refers to a high-voltage storage device for power supply, in particular of an automotive vehicle.

In a high-voltage storage device, which is normally called battery, for the power supply of an automotive vehicle, energy storage modules are used for driving the vehicle, e.g. electric vehicles or hybrid vehicles. A respective energy storage module typically consists of a plurality of stacked storage cells. The individual storage cells contain electrochemical cells of the battery. The stack consisting of the individual storage cells is mostly clamped. Apart from the mechanical fixation of the modules relative to one another, clamping particularly serves to counteract deformation by gas pressure changes which during operation occur in the electrochemical cells arranged in the interior of the modules. The plurality of storage cells of the energy storage modules must be electrically connected to one another. Furthermore, protection against contact must be ensured during assembly and operation. The gases evolving in the storage cells must be able to exit out of the high-voltage battery.

It is the object of the present invention to indicate a high-voltage battery for power supply which, while being producible and mountable at low costs, ensures adequate protection against contact, and it should simultaneously be possible for a gas to exit out of the interior of the high-voltage battery.

This object is achieved by the features of the independent claims. The dependent claims refer to preferred developments of the invention.

Hence, the object is achieved by a high-voltage battery for power supply, particularly of an automotive vehicle. The high-voltage battery comprises an energy storage module with a plurality of electrochemical storage cells and with a wall accommodating the plurality of storage cells. Each of the storage cells comprises at least two electric connection terminals. Furthermore, according to the invention, the high-voltage battery comprises an upper part for contacting and covering the connection terminals. The upper part overlaps the wall in a contactless manner. Owing to this overlap between the wall of the energy storage module and the upper part, protection against contact is ensured. The overlap is here particularly configured such that a mechanic cannot grip under the upper part and thereby reach the electromechanical storage cells and the connection terminals, respectively. Since the overlap is configured to be contactless, a small gap is created between upper part and wall, so that a gas generated in the storage cells is able to exit. An excessively high internal pressure in the energy storage module is thereby avoided. The upper part can preferably be made from plastics by way of an injection molding technique. The gas exits through the small gap in the overlap region. No separate channels are needed for the gas discharge, and no additional insulations are required.

In a preferred variant, it is provided that the storage cells are prismatic storage cells which, while being stacked into at least one row, are arranged one after the other and are clamped between two end plates via tie rods. The two end plates and the two tie rods jointly form the wall of the energy storage module. Specifically, the tie rods and the end plates are dimensioned such that they laterally completely cover the stacked storage cells. The upper part preferably covers the complete top side of the energy storage module. A bottom is preferably located on the bottom side. The individual storage cells are thereby completely enclosed by the wall, the upper part and the bottom.

Furthermore, it is preferably provided that the wall comprises an inwardly offset shoulder overlapped by the upper part. Said inwardly offset shoulder may be formed on the end plates and/or on the tie rods. Particularly preferably, the shoulder comprises a first portion which extends inwards perpendicular to the wall. A second portion of the shoulder is positioned at the end of said first portion. Said second portion extends in parallel with the wall and perpendicular to the first portion, respectively. An inwardly directed or inwardly offset shoulder is thereby formed. Said shoulder can be overlapped by the upper part. The overlap with the gap is then formed between the shoulder and the upper part.

Particularly preferably, the smallest gap between upper part and wall has a size of at least 1 mm, particularly at least 2 mm. It is thereby ensured on the one hand that the user cannot grip through the gap. On the other hand, an adequate gap is ensured for the exiting gas.

It is provided in a particularly preferred variant that the upper part comprises a carrier plate with a plurality of cell connectors and a lid. The carrier plate is particularly produced as an injection-molded part from plastics. A plurality of metallic cell connectors are inserted into said carrier plate. The cell connectors serve to contact the connection terminals and to interconnect a plurality of connection terminals of different storage cells. A cable harness is e.g. connected to said cell connectors. The lid is mounted on the carrier plate and particularly on the cell connectors. It is particularly provided that the lid fully covers the complete top side of the carrier plate. Preferably, the carrier plate, as a part of the upper part, overlaps the wall in a contactless manner. Hence, it is already ensured before the mounting of the lid that a mechanic cannot grip between carrier plate and wall to reach the connection terminals.

Furthermore, it is provided in a preferred variant that the connection terminals of all storage cells are oriented towards a connection surface. Said one connection surface is particularly the top side of the energy storage module. Owing to this one-sided orientation of all connection terminals, all connection terminals can be contacted and covered with a joint upper part.

Preferably, the upper part overlaps the wall over the whole circumference. This means that the upper part overlaps the wall, particularly the two end plates and the two tie rods, along the whole circumference of the energy storage module. This overlap need not be configured to be contactless over the whole circumference. It is enough when specific portions of the overlap are contactless along the circumference, and the gap for exiting gas is thereby formed.

An embodiment of the invention shall now be explained in more detail with reference to the accompanying drawing, in which.

An embodiment of the high-voltage battery 1 according to the invention shall now be explained in more detail with reference to FIGS. 1 to 3.

Figure 1:
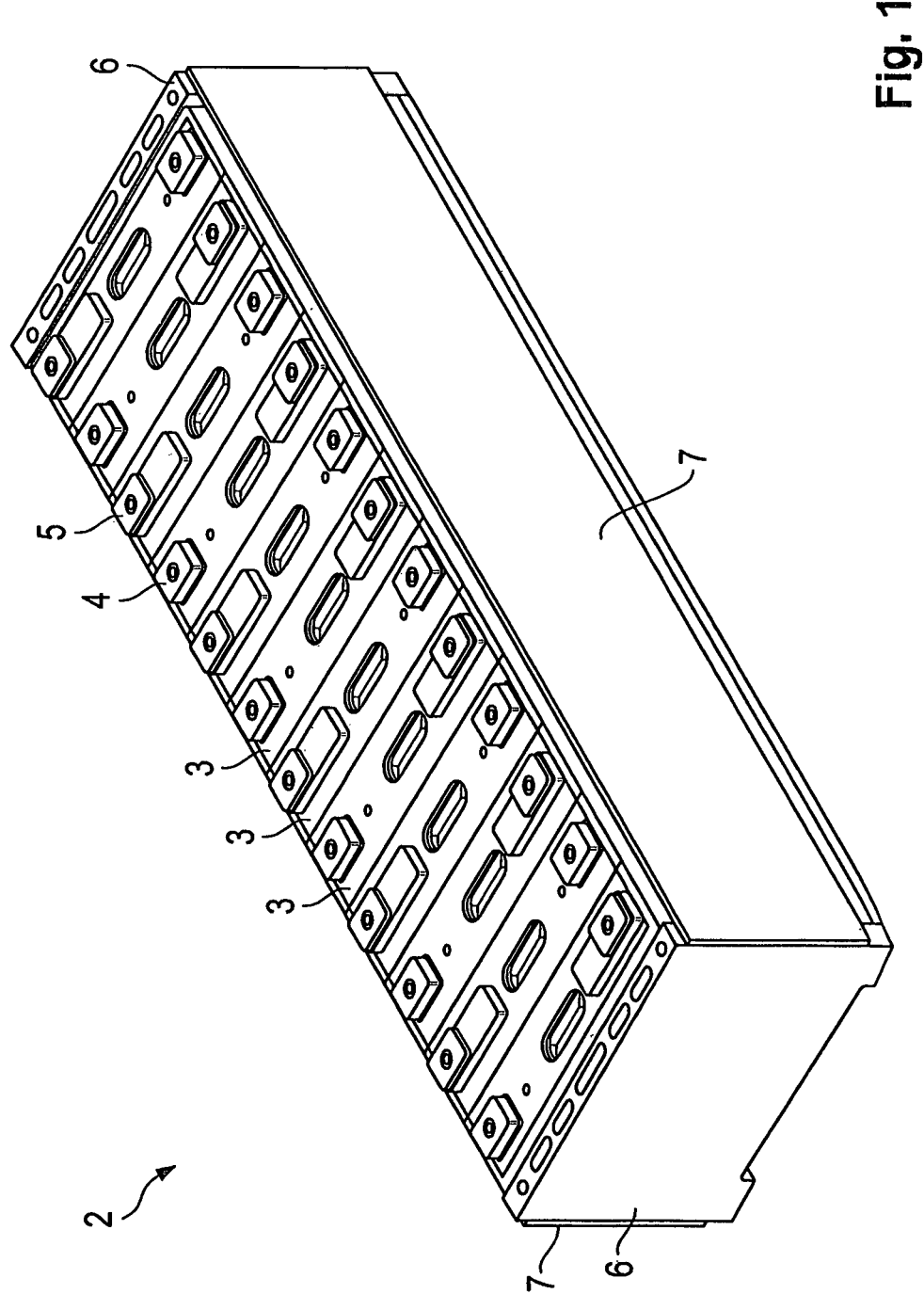
FIG. 1 shows an energy storage module of the high-voltage battery of the invention according to an embodiment.
Figure 2:
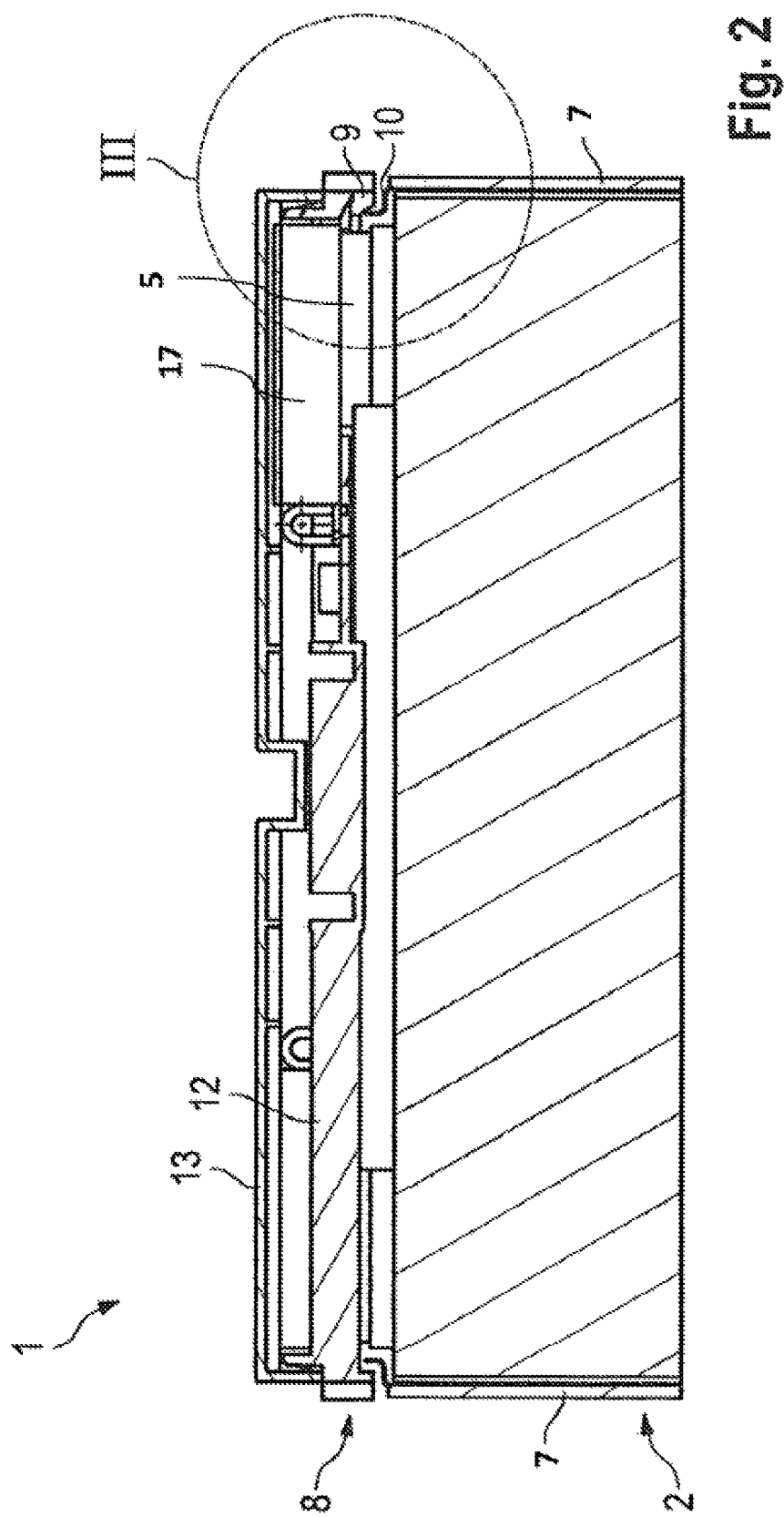
FIG. 2 is a sectional view through the high-voltage battery of the invention according to the embodiment.
Figure 3:
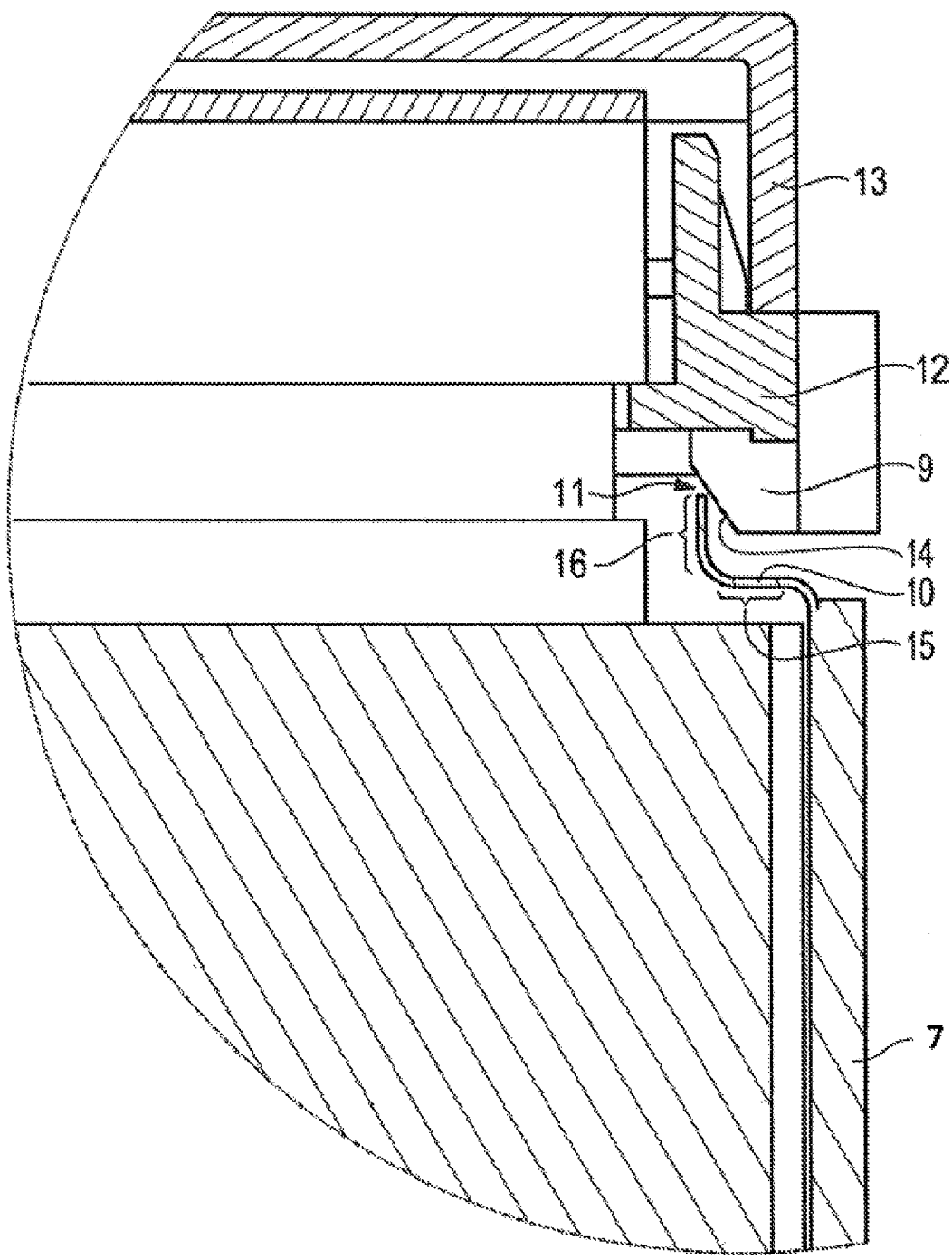
FIG. 3 is a detail section of FIG. 2.

FIG. 1 shows an energy storage module 1 of the high-voltage battery 1 even before the mounting of an upper part 8 (see FIGS. 2 and 3). In the illustrated embodiment, the energy storage module 2 comprises twelve prismatic storage cells 3. The storage cells 3 are stacked one after the other. Each of the storage cells 3 has a first electric connection terminal 4 of a first polarity and a second electric connection terminal 5 of a second polarity. A respective end plate 6 is positioned at the beginning and at the end of the stacked storage cells. The two end plates 6 are interconnected via two tie rods 7. The two end plates 6 and the two tie rods 7 jointly form a wall 6, 7 of the energy storage module 2. The individual storage cells 3 are accommodated within said wall 6, 7.

FIG. 2 shows a section through the high-voltage battery 1. Said high-voltage battery 1 comprises the energy storage module 2 shown in FIG. 1 and an upper part 8. Said upper part 8 serves to cover the full top side with the connection terminals 4, 5 of the energy storage module 2. The upper part 8 comprises a carrier plate 12 and a lid 13. The carrier plate 12 and the lid 13 are configured as injection-molded parts. A plurality of metallic cell connectors 17 are inserted 4 into the carrier plate 12. These cell connectors 17 contact the individual connection terminals 4, 5 and connect individual connection terminals 4, 5 of different storage cells 3 to one another. Upwardly, the carrier plate and particularly said cell connectors 17 are covered with the lid 13.

The upper part 8, especially the carrier plate 12, overlaps the wall 6, 7 of the energy storage module 2. Said overlap is configured at least in part to be contactless, so that the exit of gas out of the interior of the energy storage module 2 to the outside is ensured. At the same time the overlap guarantees that a mechanic cannot grip between upper part 8 and wall 6, 7 to reach the storage cells 2 and the connection terminals 4, 5, respectively.

The configuration of this overlap on the high-voltage battery 1 is shown in detail in FIG. 3. According to FIG. 3, the end plate 6 comprises an inwardly offset shoulder 10. Said shoulder 10 comprises a first portion 15 and a second portion 16. The first portion 15 is inwardly directed substantially perpendicular to the end plate 6. From the end of said first portion 15 the second portion 16 extends upwards in parallel with the end plate 6. Said shoulder 10 is overlapped by an extension 9 of the carrier plate 12. In the embodiment illustrated herein, the upper part 8 thus grips around the wall 6, 7 from the outside. A gap 11 is formed between the shoulder 10 and the extension 9. To this end, an internal land 14 is formed on the extension 9. The gap 11 is dimensioned such that a mechanic cannot grip therethrough with his/her hand. The gap 1, however, is also large enough to ensure an adequate gas exit out of the interior of the energy storage module 2.

The overlap and the gap 11 can be formed on the end plates 6 and also on the tie rods 7. The overlap need here not be contactless over the whole circumference. It is enough when the overlap between upper part 8 and wall 6, 7 is contactless at specific places, so that gas can exit at said places.

According to the invention a labyrinth structure is formed between the upper part 8 and the wall 6, 7 of the energy storage module 2. The preferably used injection molding technique for the carrier plate 12 and lid 13 permits a complex design of said components without any excessively high production costs. Owing to the labyrinth structure no additional costs are incurred for possible insulating materials or for gas discharging channels. Furthermore, the labyrinth structure simultaneously permits two functions, namely protection against contact and gas exit.

LIST OF REFERENCE NUMERALS

1 High-voltage battery
2 Energy storage module
3 Storage cells
4, 5 Connection terminals
6, 7 Wall (end plates and tie rods)
8 Upper part
9 Extension
10 Shoulder
11 Gap
12 Carrier plate
13 Lid
14 Land
15 First portion
16 Second portion

The invention claimed is:

1. A high-voltage storage device for power supply, particularly of an automotive vehicle, comprising:
an energy storage module with a plurality of electrochemical storage cells and a wall accommodating the plurality of storage cells, each storage cell comprising at least two electric connection terminals, and
an upper part for contacting and covering the connection terminals,
said upper part overlapping the wall in a contactless manner, so that a gap remains relative to the storage cells
wherein the wall comprises an inwardly offset shoulder overlapped by the upper part,
wherein the shoulder comprises a first portion which extends inwards perpendicular to the wall, and a second portion of the shoulder is positioned at the end of said first portion, said second portion extends in parallel with the wall and perpendicular to the first portion, wherein the gap is formed between the shoulder and the upper part, so that a gas generated in the storage cells is able to exit, and
wherein a labyrinth structure is formed between the upper part and the wall.

2. The high-voltage storage device according to claim 1, wherein the storage cells are prismatic storage cells which, while being stacked into at least one row, are arranged one after the other and are clamped between two end plates via tie rods, with the end plates and the tie rods forming the wall.

3. The high-voltage storage device according to claim 1, wherein the smallest gap between upper part and wall is at least 1 mm, particularly at least 2 mm.

4. The high-voltage storage device according to claim 1, wherein the upper part comprises a carrier plate with a plurality of cell connectors for contacting the connection terminals and a lid mounted on the carrier plate.

5. The high-voltage storage device according to claim 4, wherein the carrier plate overlaps the wall in a contactless manner.

6. The high-voltage storage device according to claim 4, wherein the lid completely covers the carrier plate.

7. The high-voltage storage device according to claim 1, wherein the connection terminals of all storage cells are oriented towards a connection surface.

8. The high-voltage storage device according to claim 1, wherein the upper part contacts and covers the connection terminals of all storage cells.

9. The high-voltage storage device according to claim 1, wherein the upper part overlaps the wall over the whole circumference.

* * * * *